(12) United States Patent
Iwami et al.

(10) Patent No.: US 7,343,731 B2
(45) Date of Patent: Mar. 18, 2008

(54) SKATE TRUCK FOR CABLE GUIDE

(75) Inventors: Tsutomu Iwami, Osaka (JP); Fujio Yamamoto, Saitama (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 11/784,741

(22) Filed: Apr. 9, 2007

(65) Prior Publication Data

US 2007/0277499 A1    Dec. 6, 2007

(30) Foreign Application Priority Data

Jun. 1, 2006    (JP)    ............................... 2006-153741

(51) Int. Cl.
*F16G 13/16*    (2006.01)

(52) U.S. Cl. ........................ 59/78.1; 248/51; 191/12 C

(58) Field of Classification Search ................. 59/78.1; 248/49, 51; 212/267; 191/12 C
See application file for complete search history.

(56) References Cited

U.S. PATENT DOCUMENTS

| | | | | |
|---|---|---|---|---|
| 4,462,565 A | * | 7/1984 | Johnson | ........................ 248/51 |
| 4,789,120 A | * | 12/1988 | Spidel | ........................ 248/49 |
| 5,649,415 A | * | 7/1997 | Pea | ............................ 59/78.1 |
| 6,612,104 B2 | * | 9/2003 | Blase | ........................ 59/78.1 |
| 2005/0155337 A1 | * | 7/2005 | Worms | ........................ 59/78.1 |
| 2007/0018146 A1 | | 1/2007 | Iwami et al. | |
| 2007/0022730 A1 | | 2/2007 | Iwami et al. | |

FOREIGN PATENT DOCUMENTS

| | | | |
|---|---|---|---|
| EP | 1193420 | * | 3/2002 |
| JP | 57-16273 | * | 4/1982 |
| JP | 10-220533 | * | 8/1998 |
| JP | 2005-515370 | | 5/2005 |

OTHER PUBLICATIONS

First name inventor, Tsutomu Iwami et al., U.S. Appl. No. 11/707,541, Title: Skate Unit for Cable Protection and Guide Device, filed Feb. 16, 2007.

* cited by examiner

*Primary Examiner*—David B Jones
(74) *Attorney, Agent, or Firm*—Howson & Howson LLP

(57) ABSTRACT

A skate truck for interposition between two mutually facing parts of a flexible cable guide is composed of plural skate units interconnected to one another by interconnecting members that allow both vertical articulation and lateral movement of the skate units relative to the interconnecting members and relative to adjacent skate units.

7 Claims, 8 Drawing Sheets

SKATE TRUCK FOR CABLE GUIDE

CROSS-REFERENCE TO RELATED APPLICATION

This application claims priority on the basis of Japanese patent application 2006-153741, filed Jun. 1, 2006. The disclosure of Japanese application 2006-153741 is hereby incorporated by reference.

FIELD OF THE INVENTION

The invention relates generally to cable protection and guide devices, hereinafter referred to for brevity as "cable guides," for protecting and guiding flexible cables. More specifically, the invention relates to an improved rolling skate truck, composed of a plurality of interconnected skate units, for interposition between two mutually facing parts of a folded cable guide in order to promote smooth flexing movement of the cable guide, and to prevent damage resulting from frictional contact or collision between the parts, and thereby extending the useful life of the cable guide.

BACKGROUND OF THE INVENTION

The term "flexible cable," as used herein, means any flexible, elongated, energy or fluid-conducting device, such as a cable composed of one or more electrical wires or optical fibers, a fluid-conducting hose for conducting compressed air or a hydraulic fluid used as a medium for transmission of motive power, a flexible conduit used to convey a gas, a liquid, or another fluid material for use in a machine or industrial process, a flexible actuator such as a Bowden wire, or a flexible rotating shaft with or without a non-rotating sheath. Such flexible cables are used, for example, to connect relatively moving parts of a machine such as a machine tool, an industrial robot, or a conveyor or other material-handling or material-carrying machine, such as a hoist or other machine used in a civil engineering application.

When a flexible cable is connected to a moving part, torsion, flexion, and tensile forces applied to the cable as a result of movement of the moving part can result in damage to, or distortion of, the cable, and interfere with smooth movement of the cable and of components connected to the cable. Cable guides have been used to avoid damage and distortion of the cables, and to promote smooth movement.

A typical cable guide G is shown in FIG. 6. The guide is composed of a plurality of flexibly interconnected links forming an elongated channel though which a cable C extends. The guide, which has a fixed end part G1, a movable end part G5, and an intermediate folded part G3, is configured so that a lower part G2 of the guide is in mutually facing, opposed, relationship to an upper part G4 of the guide. The particular links which constitute the folded part G3, of course, depend on the relationship between the upper part and the lower part.

Each of the links of the cable guide comprises a pair of side plates Ga disposed on opposite sides of the cable C and a pair of connecting elements Gb, bridging the side plates, one plate Gb of each link being on the outer side of the cable, i.e. on the top side of the upper part, the bottom side of the lower part or the outer side of the folded part. The side plates are hinged to one another so that the guide can bend at least in a single plane, and, preferably, the side plates are configured to limit flexion of the guide to a specific minimum radius of curvature in order to avoid kinking of the cable C.

Where a cable guide of sufficient length is folded on itself, it is possible for two portions of the guide to come into face-to-face contact with each other. Friction between the contacting parts of the guide can obstruct smooth reciprocating motion. Moreover, frictional contact over time can cause wear and eventual breakage of the cable guide. Breakage can also result from interference between projecting portions of the two facing parts of the guide.

Skate trucks, such as skate truck 400 in FIG. 7, have been used to avoid contact between the mutually facing parts of a folded cable guide. The skate truck 400 of FIG. 4 is sandwiched between the lower parts G2 and the upper parts G4 of two cable guides. A typical skate truck is described in United States Patent Application Publication No. 2005/0155337, published on Jul. 21, 2005.

The conventional skate truck 400 of FIG. 7 is composed of a number of connected skate units 410, as shown in FIG. 8. Each skate unit 410 includes four rollers 412, sandwiched between upper and lower parts of the cable guide, a first pair of rollers being rotatably mounted disposed on a left frame member 413 on one side of the skate unit and a second pair of rollers being rotatably mounted on a right frame member 413 on the opposite side of the skate unit. Connecting blocks 414, which join the adjacent truck units in series, keep the right and left frame members 413 at the required spacing from each other. As shown in FIG. 8, the frame members 413 are rigidly secured to the connecting blocks by bolts 415, which are threaded into threaded holes in the connecting blocks.

Since the adjacent skate units 410 are rigidly secured to the connecting blocks by bolts 415, the skate truck is unable to adapt to flexion of the cable guide in the vertical direction. Nor is it able to adapt to snaking movement of the cable guide in horizontal directions transverse to the direction of advancing movement of the skate truck. Thus, when horizontal or vertical flexion of the cable guide occurs, excessive force can be generated in the skate units 410, resulting in deformation or damage to the cable guide.

Accordingly, an object of this invention is to provide a skate truck having flexibility, enabling it to adapt smoothly to vertical movements of a cable guide as well as to lateral horizontal movement of the cable guide relative to the direction of movement of the skate truck.

SUMMARY OF THE INVENTION

The skate truck according to the invention comprises a plurality of skate units. Each skate unit comprising a frame and a plurality of rollers. The rollers are rotatably mounted on the frame on parallel horizontal axes for rolling contact with mutually facing parts of a cable guide. The skate units are connected to one another in a series extending along a direction of elongation by connections which allow both vertical articulating movement of the skate units relative to one another, and horizontal lateral movement of the skate units relative to one another in directions transverse to the direction of elongation of the skate truck.

Preferably, the adjacent skate units in the series are joined by connectors, and the skate units joined by each connector are both capable of vertical articulating movement relative to the connector, and also capable of horizontal lateral movement relative to the connector.

The skated units preferably comprised frames having side members maintained at a predetermined spacing from each other. The connectors can have different forms, and can comprise connecting blocks, for example, or sets of connector plates.

Where the connectors comprise connecting blocks, the widths of the connecting blocks are less than the spacing between the side members of the frames of the skate units. Because of the difference between the widths of the blocks and the spacing of the side members, gaps are provided which allow relative lateral movement of the connecting blocks and their adjacent skate units. The side members of each of said adjacent skate units can be connected by rods which extends through the connecting blocks. Alternatively, cantilevered rods fixed to the connecting blocks can extend laterally therefrom and slidably through holes in the side members of adjacent skate units.

In the case where connector plates are used, the side members of each of the adjacent skate units in the series on one side of the skate truck are joined by connectors, and the side members of adjacent skate units in the series on the opposite side of the skate truck are also joined by connectors. Each of these connectors comprises a pair of connector plates spaced from each other. The side members joined to each other by each connector extend into the space between the plates thereof, and a pair of pins extends through both plates of each connector. Each pin of the pair also extends through one of the side members joined by the connector. Each of the connecting pins is slidable in at least one of the connector plates and side member through which it extends. So long as both pins of each connector are not rigidly connected to both of the connected side members and also to a single connector plate, the joined side members are laterally movable relative to each other and therefore the joined skate units are movable laterally relative to each other.

The skate truck can flex in the vertical direction, and the connected skate units can move relative to one another laterally. The skate truck can assume a zigzag shape in the vertical direction to accommodate flexion of the portion of the cable guide extending between the bend of the cable guide and the movable end of the guide. Furthermore, horizontal relative movement of the skate units can accommodate snaking of that portion of the cable guide. Thus, strain in the cable guide, and in the skate truck, is avoided, deformation and damage to the skate units can be prevented, and the burden of maintaining the skate truck and of the cable guide is significantly reduced.

Where connecting blocks are used, the gaps between the connecting block and the side members of the skate unit frames allow lateral movement of the skate units relative to the conneting blocks and relative to one another. Where connectors comprising pairs of connector plates and pins are utilized, the skate units can shift laterally relative to one another with limits determined by the lengths of the pins.

DETAILED DESCRIPTION OF THE PREFERRED EMBODIMENTS

Figure 1:
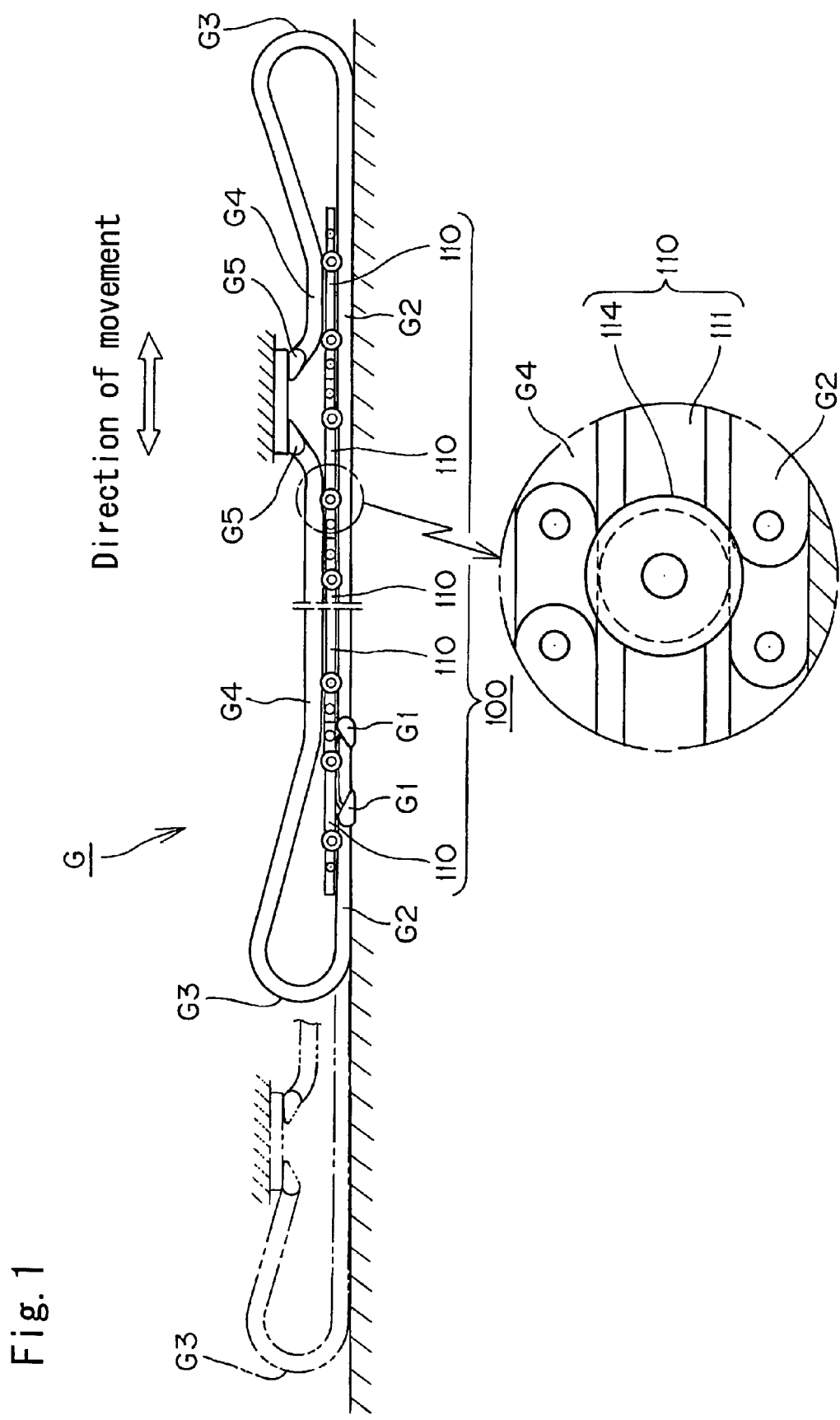
FIG. 1 is a schematic elevational view showing a use skate truck according to the invention in use between upper and lower mutually facing parts of two cable guides, and including an enlarged view of a portion of the skate truck.

The skate truck 100, shown in FIG. 1, cooperates with a pair G of opposed cable guides. Each of the two cable guides corresponds to the cable guide depicted in FIG. 6, and comprises a series of articulably interconnected links, each link comprising a pair of side plates Ga disposed on both sides of a cable C and connecting elements Gb, bridging the side plates, one plate Gb of each link being on the outer side of the cable, i.e. on the top side of the upper part, the bottom side of the lower part or the outer side of the folded part. The side plates are hinged to one another so that the guide can bend at least in a single plane, and, preferably, the side plates are configured to limit flexion of the guide to a specific minimum radius of curvature in order to avoid kinking of the cable C.

Figure 6:
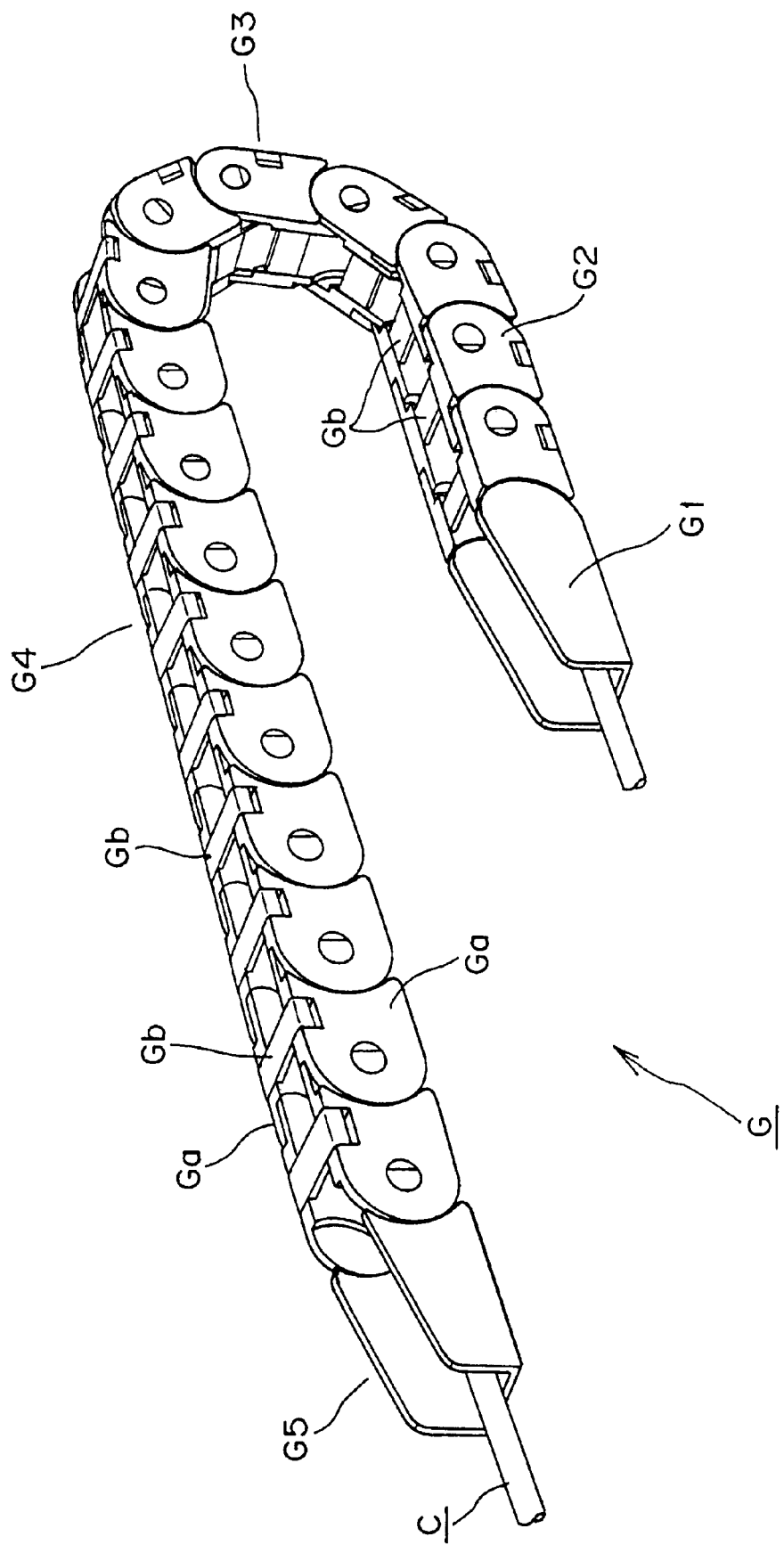
FIG. 6 is perspective view of a cable guide.
Figure 7:
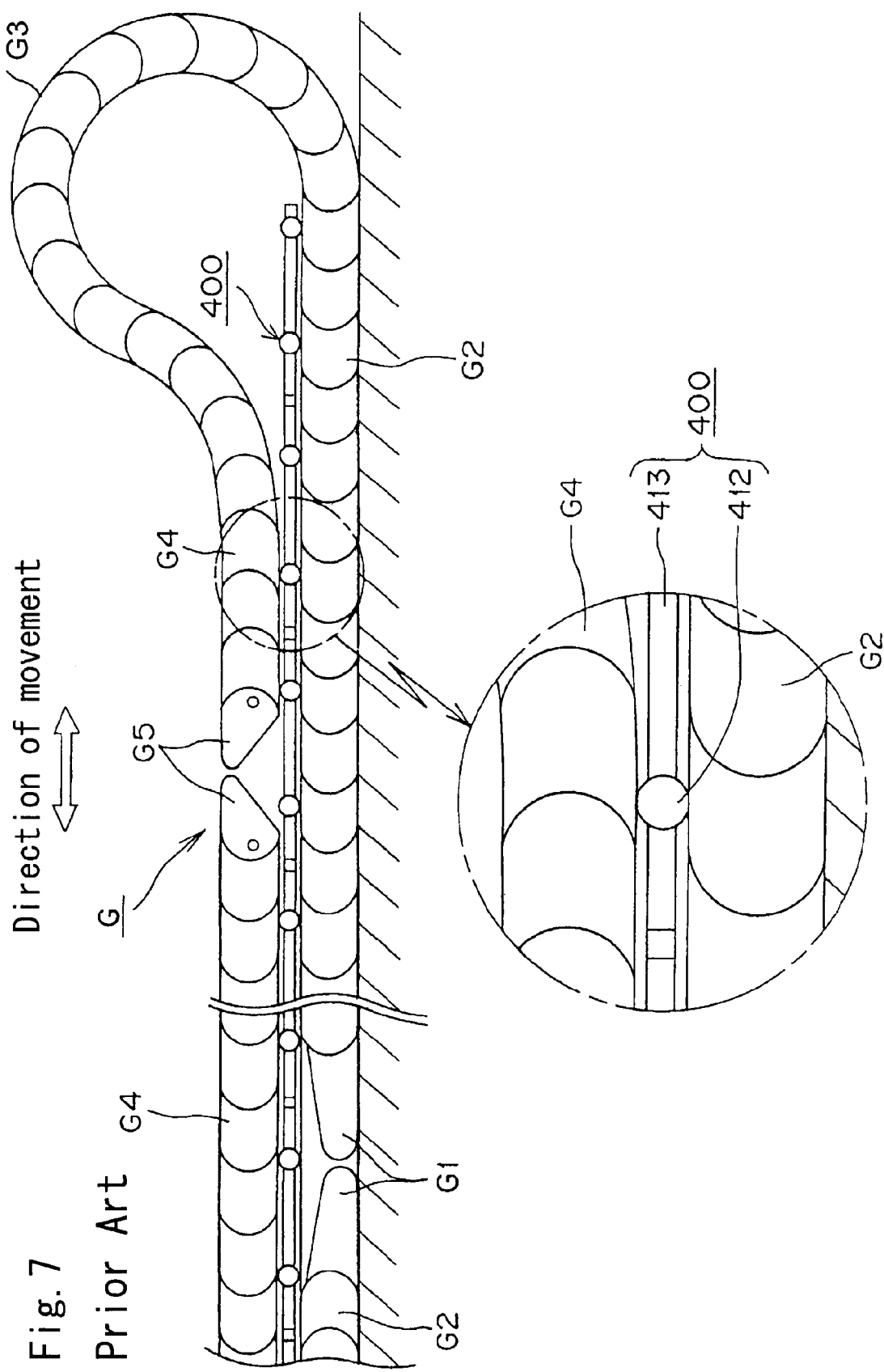
FIG. 7 is schematic side elevational view of a conventional skate truck used to prevent direct contact between upper and lower parts of pair of cable guides, and including an enlarged view of a portion of the cable guide and skate truck assembly.
Figure 8:
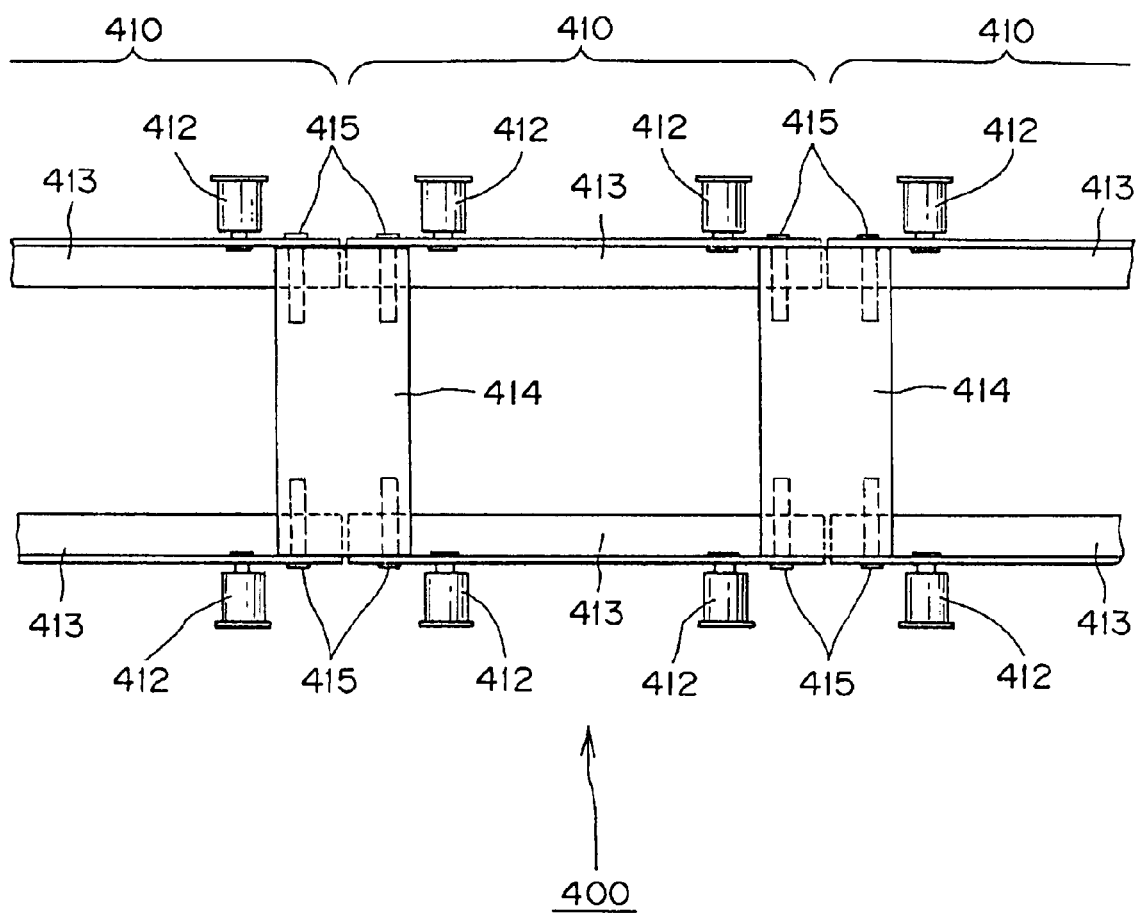
FIG. 8 is a top plan view of a conventional skate truck.

The cable C can be any flexible cable such as an electric cable, optical fiber cable, mechanical drive, fluid supply hose or the like, or a plurality of electrical conductors, fiber cables, hoses, etc. or combinations thereof. The cable is safely and reliably protected and guided, while it is being moved, because the cable is disposed within a the guide, and the folded portion of the cable is situated with a folded part G3 of the guide, situated between a fixed end G1 and a movable end G5, as shown in FIGS. 1 and 6.

The skate truck 100 comprises a plurality of skate units 110, connected to one another. The skate truck cooperates with the pair of cable guides, and moves on the lower portions of the cable guides, while the upper portions of the cable guides are in engagement with, and move on, the skate truck. Thus, the skate truck is disposed on inner side of folded parts of the cable guides. As the movable ends G5 of the cable guides move back and forth, i.e., from left to right and from right to left in FIG. 1, the skate truck 100 travels in the same direction as the direction of travel of the movable ends of the cable guides, but at half the speed, and through only half the distance. The skate truck prevents mutual contact between the lower portions G2 and the upper portions G4 of the guides.

Figure 2:
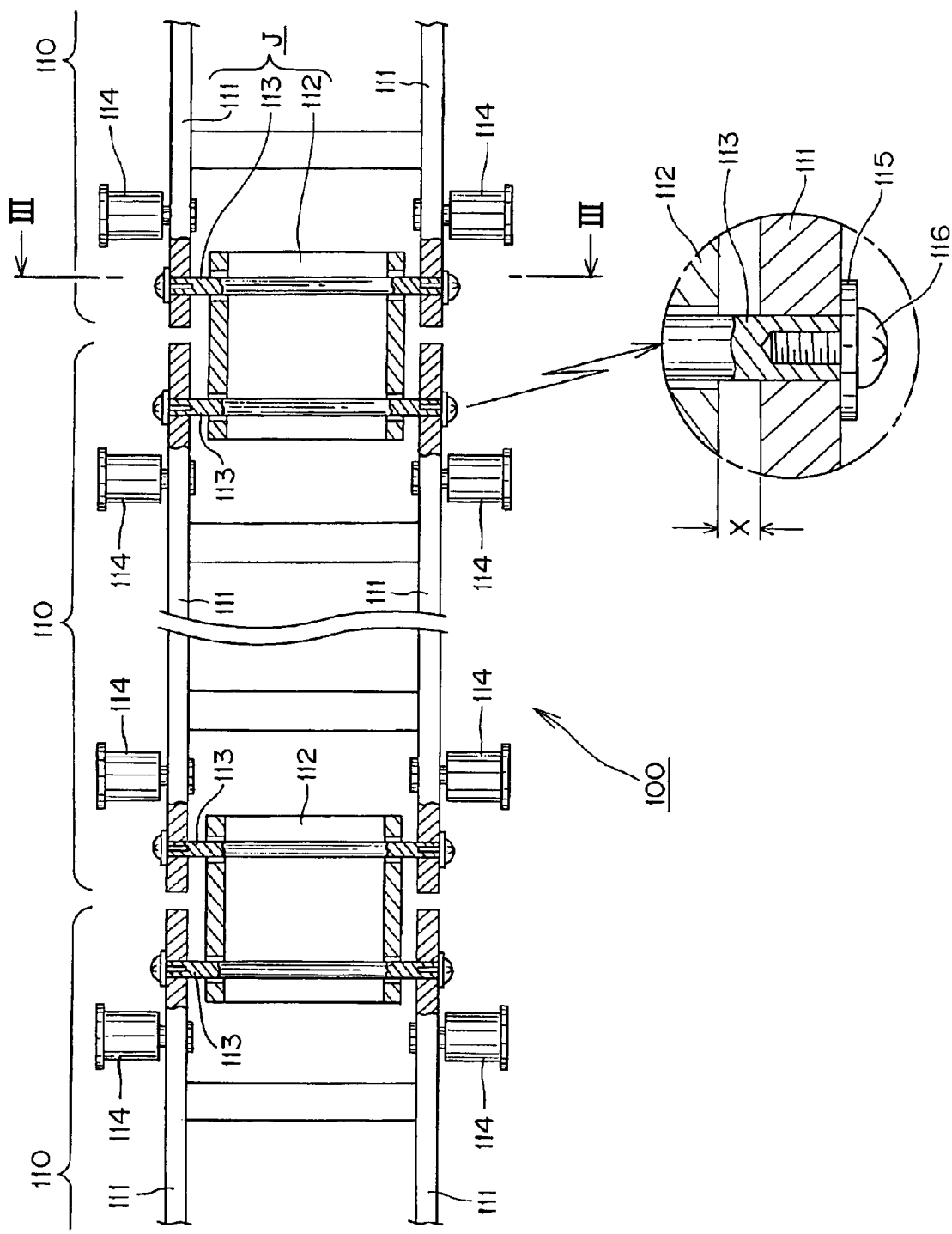
FIG. 2 is a top plan view of a portion of the skate truck shown in FIG. 1, and includes an enlarged view of a portion of the skate truck.
Figure 3:
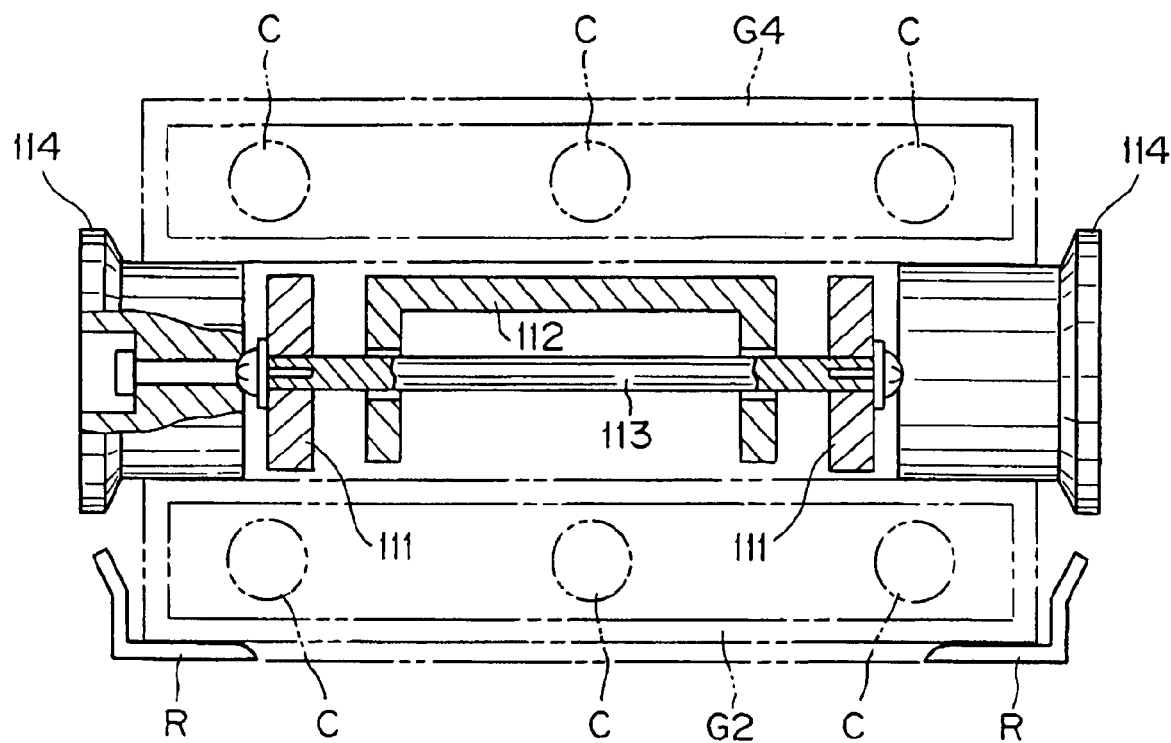
FIG. 3 is a cross-sectional view taken on section plane III-III of FIG. 2.

As shown in FIGS. 1 to 3, each of the skate units comprises a frame having side members 111 on which plurality of rollers 114 are mounted rotatably. These rollers 114 are sandwiched between the lower and upper parts G2 and G4 of the cable guide. Connecting blocks 112, each having a U-shaped cross-section and being preferably formed of sheet steel, are disposed between the side members adjacent the ends thereof, and each connecting block 112 extends between the side members 111 of two adjacent skate units. A connecting rod 113 is inserted through holes formed in the side members and extends through holes formed in the upright side walls of the U-shaped connecting blocks. The rods are secured by screws 116, which extend through washers 115 on both ends of the connecting rods 113, thereby establishing a maximum spacing between the side members 111 of each skate unit. The side members are held apart from each other by lateral connecting members also shown in FIG. 2.

As shown in FIG. 2, the connecting rods can rotate in the openings of the side walls of the connecting blocks 112. The rotatability of the connecting rods in the side walls of the connecting blocks allows flexion of the skate truck in the vertical direction. The enlargement portion of FIG. 2 shows that gaps X are provided between the connecting blocks 112 and the side members 111. Since the connecting blocks are free to move along the connecting rods within the ranges defined by gaps X, lateral movement of the skate units relative to the connecting blocks, and therefore, lateral movement of the skate units relative to one another, is permitted. Thus, in the skate truck 100, of the embodiment shown in FIGS. 1, 2 and 3, the connection of the skate units to one another, which is indicated generally by the letter J, allows mutual flexion of the skate units 110 in the vertical direction (that is, the vertical direction in FIG. 1), and relative horizontal, lateral movement of the skate units with respect to the general direction of movement of the skate truck 100.

Whereas, in the case of a rigid skate truck, vertical movement of the folded part G3 of the cable guide, and of the movable end portion G5 of the cable guide, could exert a strain tending to damage the cable guide, the vertical movement can be accommodated by the ability of the skate units of the skate truck to articulate relative to one another in the vertical direction. Because adjacent skate units are joined by connectors to which both of the adjacent skate units are pivoted, the skate truck can even assume a zigzag configuration (in side elevation), if necessary. Thus, damage to the cable guide due to vertical flexing movement can be prevented.

Furthermore, even if snaking, i.e. lateral flexion, occurs in the upper part G4 of the cable guide, i.e. the part between the folded part G3 and the movable end G5, the lateral flexion is accommodated by horizontal relative movements of the skate units and their connecting blocks within the range afforded by gaps X. Consequently, the skate truck exhibits lateral flexibility as well as vertical flexibility. Therefore, the skate truck, by virtue of its flexibility can prevent damage to the cable guide as well as damage to itself due to excessive deformation. The flexibility of the skate truck also makes it possible to carry out maintenance of the cable guide and the skate truck more easily, since the skate units can be more easily moved both laterally and vertically.

Figure 4:
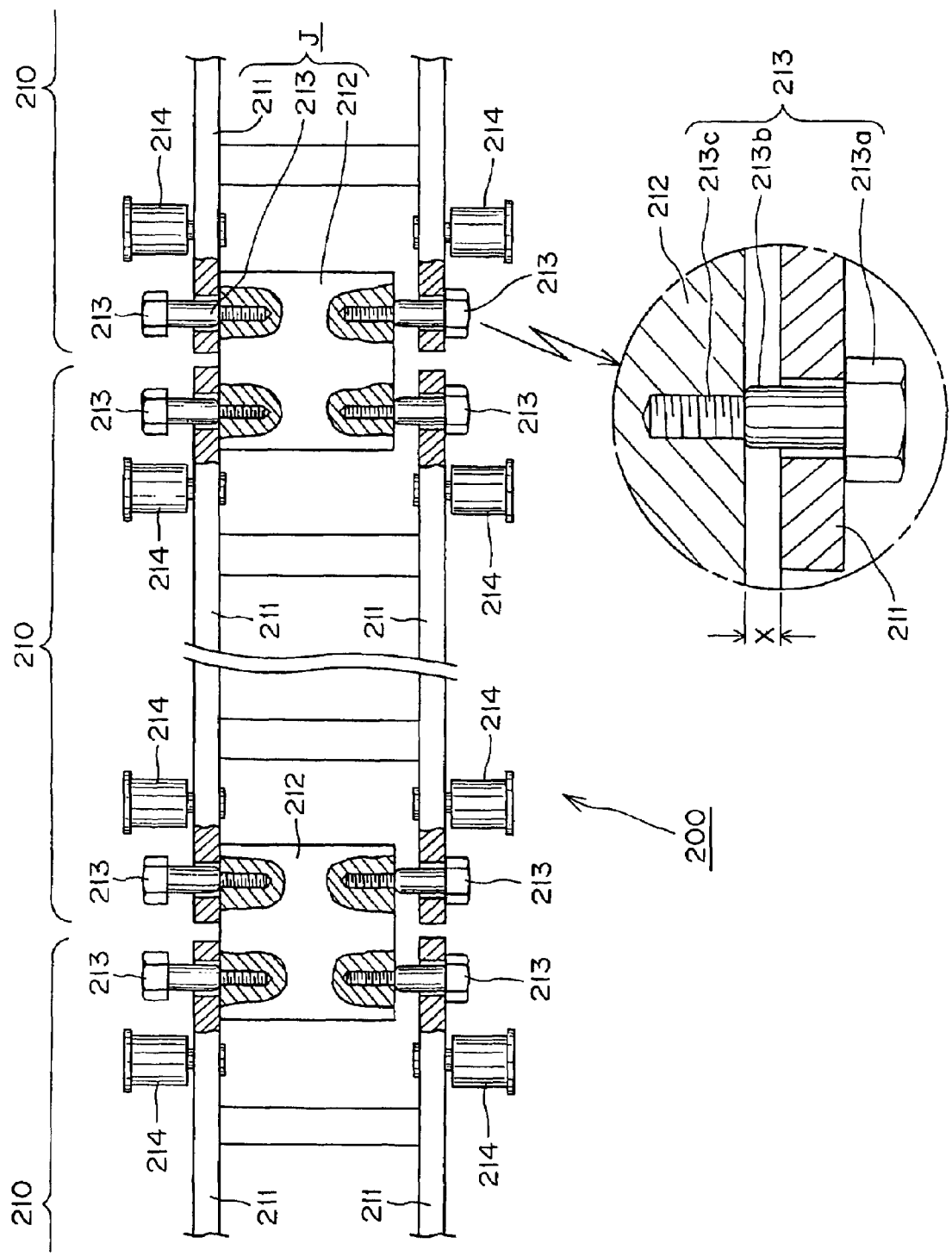
FIG. 4 top plan view of a portion of a skate truck in accordance with a second embodiment of the invention, and includes an enlarged view of a portion of the skate truck.

In a second embodiment of the invention, shown in FIG. 4, a skate truck 200, which is used with a cable guide in the same manner as the skate truck of the first embodiment, is composed of a plurality of skate units 210 connected to one by connections J, which allow flexion of the skate truck in the vertical direction, and also allow relative lateral horizontal movements of the skate units.

Rollers 214 are rotatably mounted on side members 211 of the skate units 210, and these rollers are sandwiched between the lower and upper parts of the cable guides. The connecting blocks 212 are provided with cantilevered shafts which extend through holes formed in the side members of the skate units. The cantilevered shafts are constituted by unthreaded cylindrical portions of the shanks of bolts 213, which are threaded into the connecting blocks 212. The heads of the bolts are spaced from the sides of the connecting blocks, and the side members 211 of the skate units are not only rotatable about the bolts but also movable laterally along the bolts. The distance between the heads of the bolts and the sides of the connecting blocks is such that a gap X is provided, as shown in the enlarged part of FIG. 4, allowing for limited lateral movement of the skate units relative to the connecting blocks and relative to one another.

The length of the gap X is equal to the difference between the length of the cylindrical portion of a bolts and the thickness of a side member of a skate unit.

In the embodiment of FIG. 4, as in the first embodiment, vertical flexion and snaking are accommodated, and maintenance is facilitated, by the ability of the skate truck to flex vertically and by the ability of the skate units to move laterally relative to one another.

Figure 5:
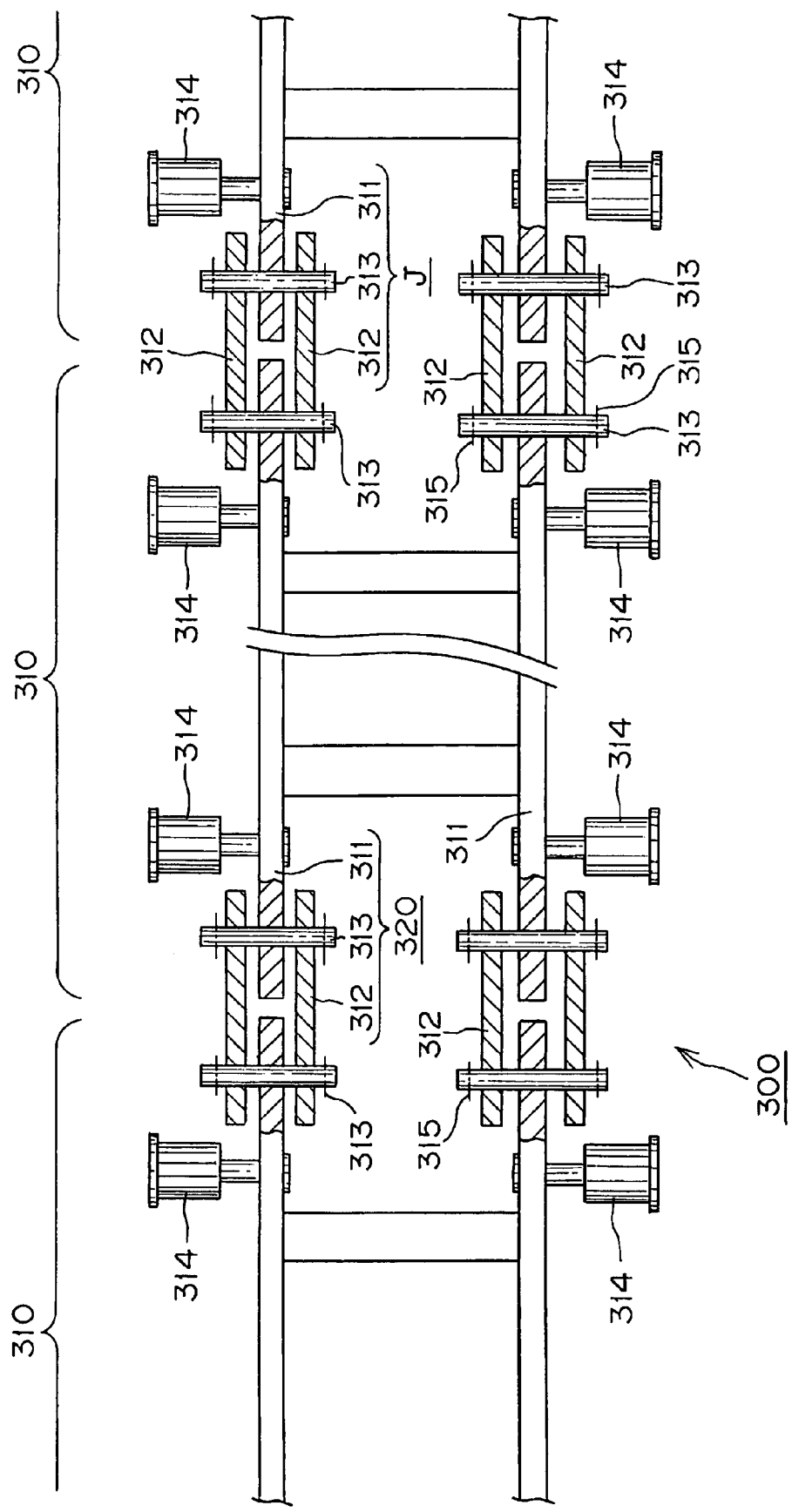
FIG. 5 is a top plan view of a skate truck according to a third embodiment of the invention.

In a third embodiment, as shown in FIG. 5, a skate truck 300 is composed of a plurality of skate units 310 connected to one another by connections J, which allows vertical flexion of the skate truck as well as relative lateral horizontal movement of the skate units.

Rollers 314 are mounted rotatably on side members 311 of the skate units 310, and are sandwiched between upper and lower parts of folded cable guides as in the previously described embodiments. Adjoining skate units are connected by two pairs of plates 312. The plates 312 of a first pair are disposed on opposite sides of left side members 311 of two successive skate units, and plates 312 of a second pair are disposed on opposite sides of the right side members 311 of the same two successive skate units. The plates 312 of each pair are joined by two connecting pins 313, which extend loosely through holes in the side members in these members. Split pins 315 are used to prevent the plates 312 from becoming disenaged from pins 313. The connecting pins 313 allow the adjoining skate units to articulate vertically relative to each other, and the positions of the split pins are such that the ajoining skate units can move laterally in a horizontal direction relative to each other by an amount corresponding to the gap X described with reference to the first and second embodiments.

In the embodiment of FIG. 4, as in the first and second embodiments, vertical flexion and snaking are accommodated, and maintenance is facilitated, by the ability of the skate truck to flex vertically and by the ability of the skate units to move laterally relative to one another.

The invention claimed is:

1. A skate truck for interposition between mutually facing parts of a folded cable guide, the skate truck comprising a plurality of skate units, each skate unit comprising a frame and a plurality of rollers, rotatably mounted on the frame on parallel horizontal axes, for rolling contact with the mutually facing parts of a cable guide, the skate units being connected to one another in a series extending along a direction of elongation by connections which allow both vertical articulating movement of the skate units relative to one another, and horizontal lateral movement of the skate units relative to one another in directions transverse to the direction of elongation of the skate truck.

2. A skate truck according to claim 1, in which adjacent skate units in the series are joined by connectors, and in which the skate units joined by each connector are both capable of vertical articulating movement relative to said connector.

3. A skate truck according to claim 1, in which adjacent skate units in the series are joined by connectors, and in which the skate units joined by each connector are both capable of horizontal lateral movement relative to said connector.

4. A skate truck according to claim 1, in which each skate unit comprises a frame having a pair of spaced side members extending along said direction of elongation, in which adjacent skate units in the series are joined by connectors, in which each connector comprises a connecting block, in which the side members of each of said adjacent skate units are maintained at a predetermined spacing from each other, in which the side members of each of said adjacent skate units are connected by rods which extends through said connecting block, and in which the width of the connecting block is less than the spacing between the side members of the frames of the skate units, whereby gaps are provided which allow relative lateral movement of the connecting block and said adjacent skate units.

5. A skate truck according to claim 1, in which each skate unit comprises a frame having a pair of spaced side members extending along said direction of elongation, in which adjacent skate units in the series are joined by connectors, in which each connector comprises a connecting block, in which cantilevered rods, fixed to the connecting block extend laterally therefrom and slidably through holes in the side members of said adjacent skate units, and in which the width of the connecting block is less than the spacing between the side members of the frames of the skate units, whereby gaps are provided which allow relative lateral movement of the connecting block and said adjacent skate units.

6. A skate truck according to claim 1, in which each skate unit comprises a frame having a pair of spaced side members extending along said direction of elongation, in which the side members of each of said adjacent skate units are maintained at a predetermined spacing from each other, in which the side members of adjacent skate units in the series on one side of the skate truck are joined by connectors and the side members of adjacent skate units in the series on the opposite side of the skate truck are also joined by connectors, in which each of said connectors comprising a pair of connector plates spaced from each other, in which the side members joined to each other by each connector extend between the plates thereof, in which a pair of pins extends through both plates of each connector and each pin of the pair also extends through one of the side members joined by the connector, and in which each of the connecting pins is slidable in at least one of the connector plates and side member through which it extends, and the joined side members are laterally movable relative to each other.

7. A skate truck according to claim 1 in combination with a folded cable guide, in which at least part of the skate truck is disposed between mutually facing parts of the cable guide.

* * * * *